(12) United States Patent
Roesner

(10) Patent No.: US 10,079,562 B2
(45) Date of Patent: Sep. 18, 2018

(54) METHOD FOR SWITCHING ON A MULTI-PHASE ELECTRICAL MACHINE IN A MOTOR VEHICLE

(71) Applicants: Robert Bosch GmbH, Stuttgart (DE); SEG AUTOMOTIVE GERMANY GMBH

(72) Inventor: Julian Roesner, Untergruppenbach (DE)

(73) Assignees: ROBERT BOSCH GMBH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 0 days.

(21) Appl. No.: 15/565,646

(22) PCT Filed: Mar. 21, 2016

(86) PCT No.: PCT/EP2016/056136
§ 371 (c)(1),
(2) Date: Oct. 10, 2017

(87) PCT Pub. No.: WO2016/177507
PCT Pub. Date: Nov. 10, 2016

(65) Prior Publication Data
US 2018/0083554 A1 Mar. 22, 2018

(30) Foreign Application Priority Data
May 6, 2015 (DE) .................. 10 2015 208 353

(51) Int. Cl.
*G05B 11/28* (2006.01)
*H02P 1/46* (2006.01)
(Continued)

(52) U.S. Cl.
CPC ............ *H02P 1/46* (2013.01); *H02P 21/0085* (2013.01); *H02P 21/24* (2016.02); *H02P 21/34* (2016.02)

(58) Field of Classification Search
CPC ...... H02P 1/00; H02P 3/00; H02P 6/00; H02P 6/14; H02P 1/46; H02P 3/18; H02P 21/24;
(Continued)

(56) References Cited

U.S. PATENT DOCUMENTS 7,358,698 B2 * 4/2008 Seguchi ................. H02K 19/28
310/180
7,880,424 B2 * 2/2011 Seguchi ............... H02K 21/042
318/523
(Continued)

FOREIGN PATENT DOCUMENTS

DE         19532477 A1    3/1996
DE      102005012052 A1   10/2006
(Continued)

OTHER PUBLICATIONS

International Search Report dated Sep. 16, 2016, of the corresponding International Application PCT/EP2016/056136 filed Mar. 21, 2016.

*Primary Examiner* — Antony M Paul
(74) *Attorney, Agent, or Firm* — Norton Rose Fulbright US LLP; Gerard Messina

(57) ABSTRACT

A method for switching on a multi-phase electrical machine in a motor vehicle, the multi-phase electrical machine having a rotor having a rotor winding, and a stator having a multi-phase stator winding; a phase voltage having a phase voltage vector being applied, in a PWM operating mode, to the stator winding, said vector corresponding in terms of absolute magnitude and direction to a pole wheel voltage vector of a pole wheel voltage; the rotor winding being
(Continued)

energized by an excitation current; and the PWM operating mode being deactivated, and a block operating mode for application of the phase voltage being activated, when at least one parameter influencing the pole wheel voltage reaches a threshold value.

9 Claims, 5 Drawing Sheets

(51) Int. Cl.
  *H02P 21/00* (2016.01)
  *H02P 21/34* (2016.01)
  *H02P 21/24* (2016.01)

(58) Field of Classification Search
  CPC ........ H02P 21/34; H02P 21/0085; H02P 1/48; H02P 1/42; H02P 1/24; H02P 1/26; H02P 27/04; H02P 21/00; G05B 11/28
  USPC .... 318/400.01, 400.02, 400.14, 400.15, 700, 318/701, 727, 779, 800, 801, 799, 805, 318/807, 811, 599; 388/800, 811, 819; 363/21.1, 40, 44, 95, 120, 174, 175
  See application file for complete search history.

(56) References Cited

U.S. PATENT DOCUMENTS

| | | |
|---|---|---|
| 2010/0231151 A1 | 9/2010 | Ohtani et al. |
| 2011/0273125 A1 | 11/2011 | Yamada et al. |

FOREIGN PATENT DOCUMENTS

| | | |
|---|---|---|
| DE | 102011076999 A1 | 11/2012 |
| DE | 102012217116 A1 | 3/2014 |
| DE | 102013215306 A1 | 2/2015 |
| EP | 2634898 A1 | 9/2013 |
| JP | 2010279110 A | 12/2010 |

\* cited by examiner

METHOD FOR SWITCHING ON A MULTI-PHASE ELECTRICAL MACHINE IN A MOTOR VEHICLE

FIELD

The present invention relates to a method for switching on a multi-phase electrical machine in a motor vehicle, and to a computation unit and a computer program for carrying it out.

BACKGROUND INFORMATION

Conventional electrical machines in motor vehicles can be operated in generator mode or motor mode. Such electrical machines usually have a rotor having an exciter winding (rotor winding) through which an excitation current can flow, and a stator having a multi-phase stator winding to which a multi-phase phase voltage having a phase voltage vector can be applied.

Utilization of the electrical machine in a motor vehicle can require the electrical machine to be frequently switched on and off. It can prove to be problematic to switch on the electrical machine in particular at high rotation speeds. If the phase current is switched on first, large overshoots of the phase current can occur. If an excitation voltage is switched on first, a pole wheel voltage having a pole wheel voltage vector is initially induced in the stator; that voltage can interact negatively with the phase voltage that is to be switched on subsequently, which can cause large electrical and mechanical loads on the electrical machine.

German Patent Application No. DE 10 2013 215 306 A1 describes a method for switching on an electrical machine at high rotation speeds, the phase voltage being switched on exactly when it corresponds to the pole wheel voltage.

SUMMARY

According to the present invention, a method for switching on a multi-phase electrical machine in a motor vehicle, and a computation unit and a computer program for carrying it out are provided. Advantageous embodiments described herein.

The electrical machine has a rotor having a rotor winding, and a stator having a multi-phase stator winding. A power converter is, in particular, located downstream from the stator winding. The electrical machine is connected via the power converter in particular to a vehicle electrical system, in particular to a DC voltage vehicle electrical system.

The present invention advantageously makes use of the feature that, already while the excitation current is being switched on and ramped up, a phase voltage having a phase voltage vector is applied in a PWM operating mode to the stator winding, said vector corresponding in terms of absolute magnitude and direction (pole wheel angle=0°) to the pole wheel voltage vector. Once the pole wheel voltage vector ultimately reaches, in terms of absolute magnitude and direction, a phase voltage vector of a phase voltage to be applied in a block operating mode, a switchover into the block operating mode occurs.

In accordance with the present invention, an optimum switching time for switching on the electrical machine is determined in the course of the method. Thanks to the PWM operating mode, the phase voltage can be applied in particular in accordance with the pole wheel voltage, so that phase currents of substantially 0 A are obtained. By evaluation of at least one parameter influencing the pole wheel voltage, a determination is made of an optimum point in time at which a switchover is made between the PWM operating mode and block operating mode and at which the electrical machine is thus switched on, i.e. operated in motor mode or generator mode. That point in time is determined in such a way that no undesired current spikes occur. Large electrical and mechanical loads when the electrical machine is switched on are thus avoided.

It becomes possible to switch on the electrical machine independently of a rotation speed of the electrical machine and/or of an internal combustion engine of the motor vehicle. It becomes possible in particular to switch on the electrical machine in low-stress fashion at high rotation speeds.

The method is just as suitable for a generator mode as for a motor mode of the electrical machine, and is suitable for all types of motor vehicle and commercial vehicles, in particular including hybrid vehicles.

It becomes possible in particular to operate the electrical machine in motor mode and to assist the internal combustion engine. The electrical machine can be switched on, without difficulty and without large loads, even at high rotation speeds. For example, there is no need to wait until the rotation speed falls below a permissible limit value before switching on the electrical machine. The electrical machine can be switched on at an appropriately optimum point in time.

A computation unit according to the present invention, for example a control device of a motor vehicle, is configured, in particular in terms of programmed execution, to carry out a method according to the present invention.

Implementation of the method in the form of a computer program is also advantageous because this entails particularly low costs, in particular if an executing control device is also used for further tasks and is therefore present in any case. Suitable data media for furnishing the computer program are, in particular, magnetic, optical, and electrical memories, such as hard drives, flash memories, EEPROMs, DVDs, and others. Downloading of a program via computer networks (internet, intranet, etc.) is also possible.

Further advantages and embodiments of the present invention are evident from the description below and from the figures.

The present invention is schematically depicted in the figures on the basis of exemplifying embodiments, and are described below with reference to the figures.

DETAILED DESCRIPTION OF EXAMPLE EMBODIMENTS

Figure 1:
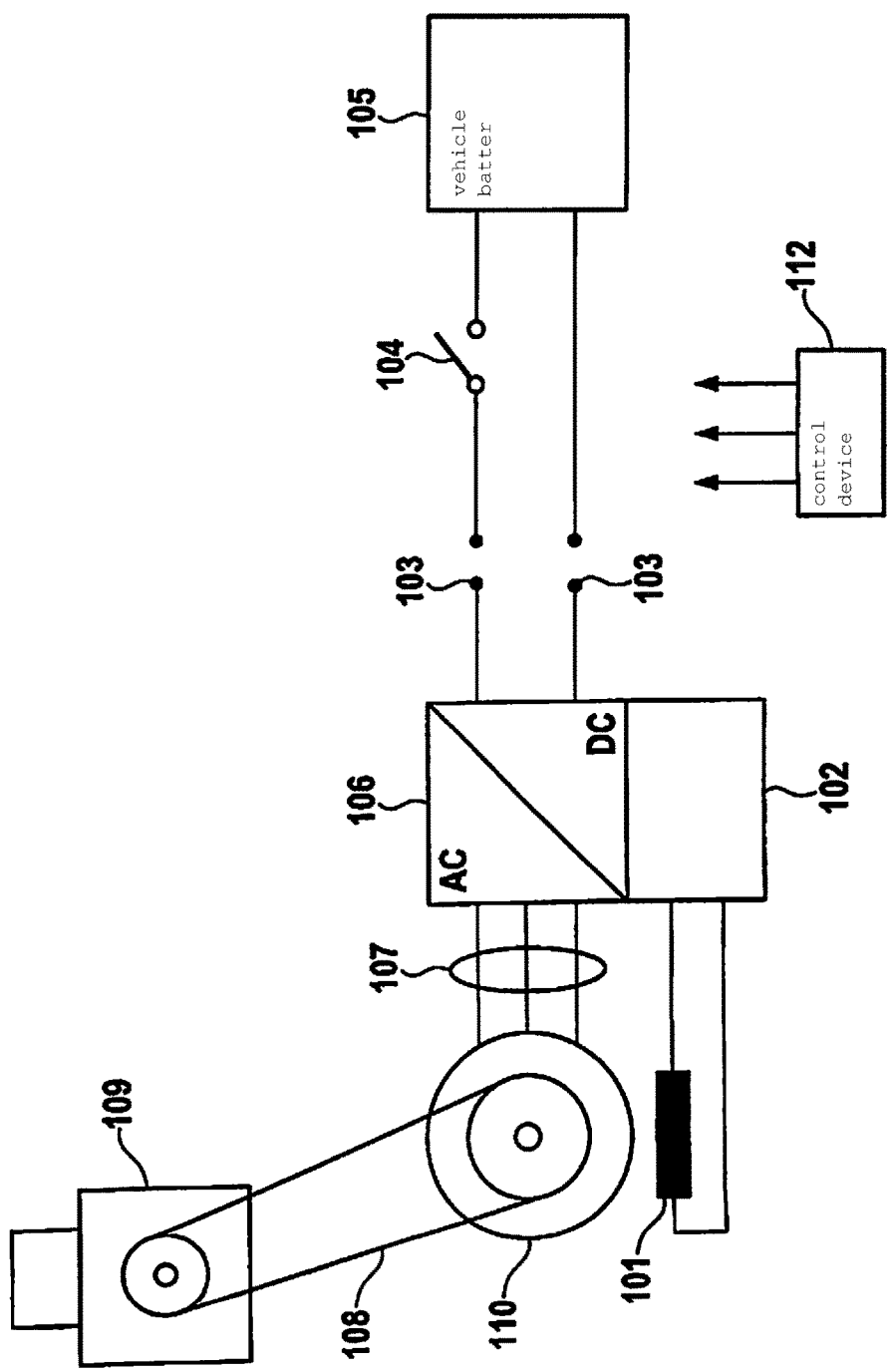
FIG. 1 schematically shows an assemblage, made up of an internal combustion engine and an electrical machine of a motor vehicle, which is configured to carry out an embodiment of the present invention.

FIG. 1 schematically shows components of a motor vehicle. The motor vehicle has an electrical machine 110, this being assumed hereinafter to be, for example, an externally excited synchronous generator. Electrical machine 110 can be operated, for example, in generator mode via an internal combustion engine 109 of the motor vehicle. Electrical machine 110 is connected in torque-transferring fashion to internal combustion engine 109 via corresponding coupling means, for example a mechanical connection 108 in the form of a belt drive or a shaft. Alternatively, electrical machine 110 can also be operated in motor mode and can assist internal combustion engine 109.

Electrical machine 110 is electrically connected to a power converter 106, several phase terminals 107 being provided. The power converter can be operated as a rectifier and as an inverter. The several phase terminals 107 are phase terminals of a multi-phase stator winding of a stator of electrical machine 110. A stator winding 101 of electrical machine 110 is connected on the DC voltage side via a field controller 102. Field controller 102 is responsible for applying control to stator winding 101. An energy reservoir, for example a vehicle battery 105, can be connected to the DC voltage side of power converter 106 via DC voltage terminals 103. Vehicle battery 105 can be connected to and disconnected from the DC voltage side of power converter 106 by a switching element 104.

A computation unit embodied as control device 112 is configured, in particular in terms of program execution, to carry out an embodiment of the method according to the present invention. In particular, control device 112 applies control in accordance with the invention to field controller 102 and to power converter 106.

Figure 2:
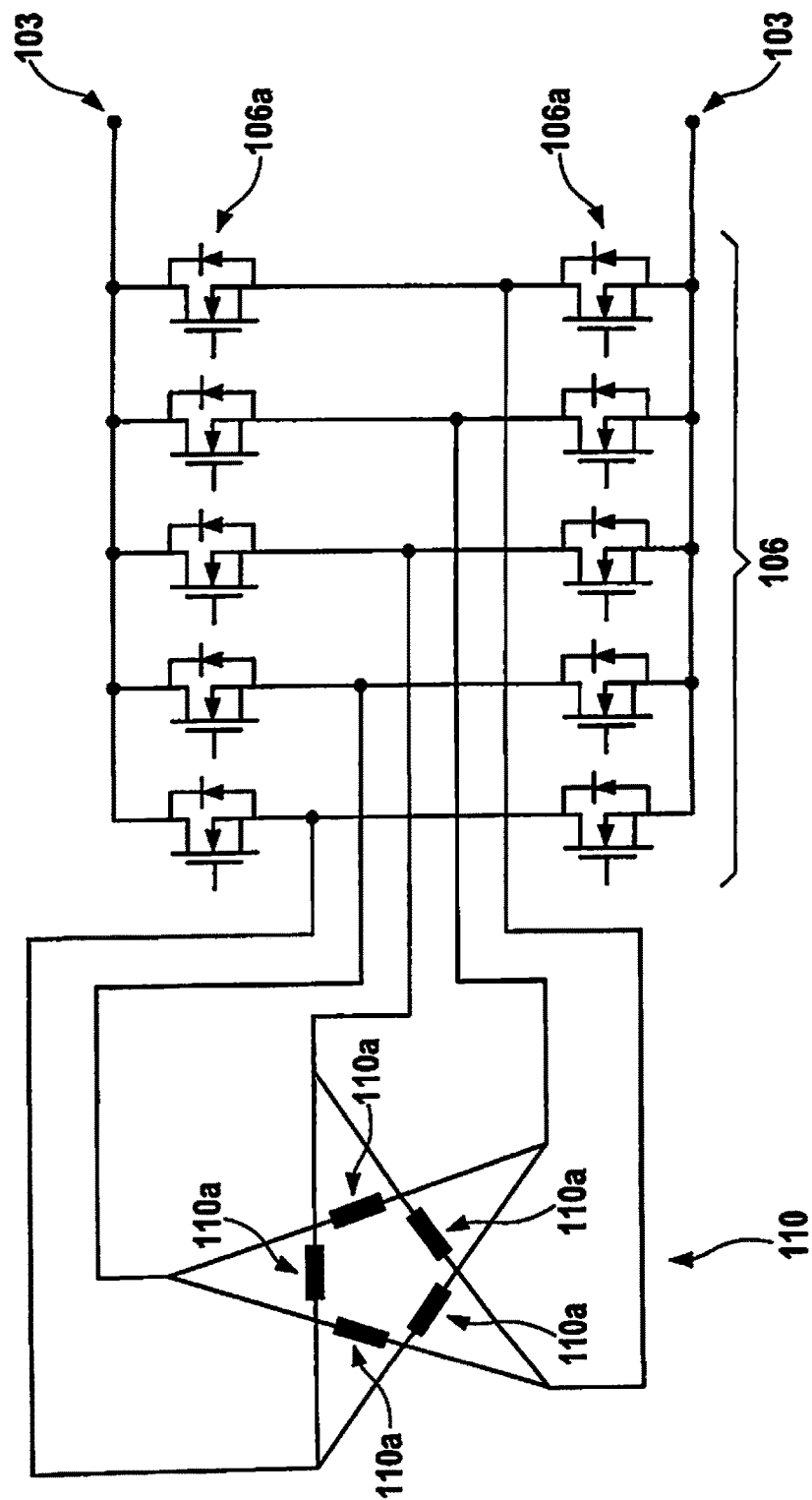
FIG. 2 shows, in the manner of a circuit diagram, a five-phase electrical machine of a motor vehicle which is configured to carry out an embodiment of the present invention.

FIG. 2 depicts electrical machine 110 in the form of a circuit diagram. In this specific example, electrical machine 110 is depicted as a five-phase electrical machine. Electrical machine 110 has a stator having a five-phase stator winding 110a. Power converter 106 has several electrical switching elements that are embodied in this specific example as metal oxide semiconductor field effect transistors (MOSFETs) 106a. MOSFETs correspond in terms of circuit engineering to a transistor and a reverse diode connected in a nonconducting direction. MOSFETs 106a are connected, for example via busbars, on the one hand to stator windings 110a and on the other hand to DC voltage terminals 103.

When electrical machine 110 is operated in a generator mode, a five-phase AC voltage, called the "phase voltage," is generated in stator winding 110a. That five-phase AC voltage is rectified into a DC voltage by appropriate switched application of control to MOSFETs 110a. Using this converted DC voltage, for example, vehicle battery 105 can be charged.

When electrical machine 110 is operated in a motor mode, the DC voltage of vehicle battery 105 is converted, by appropriate timed application of control to MOSFETs 110a, into the five-phase phased voltage having a circulating phase voltage vector. Appropriate timed application of control to MOSFETs 110a is effected here by control device 112.

The present invention is not intended to be limited to a five-phase electrical machine, but is instead suitable for electrical machines having an appropriate number of phase terminals 107.

Preferred embodiments of the method for switching on electrical machine 110 are described below with reference to FIGS. 3, 4, 5, and 6. That description is once again provided on the basis of the specific example of motor-mode operation of electrical machine 110. In particular, the preferred embodiments of the method according to the present invention are implemented by control device 112. In the course thereof, the control device correspondingly applies control in particular to field controller 102, to power converter 106, and optionally also to switching element 104.

Figure 3:
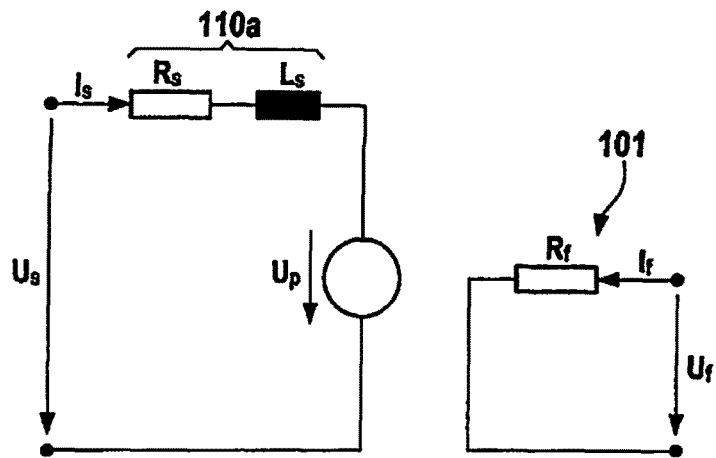
FIG. 3 schematically shows a single-phase equivalent circuit diagram of the five-phase electrical machine of FIG. 2.

FIG. 3 is a schematic single-phase equivalent circuit diagram of an externally excited synchronous machine in general, and of the five-phase electrical machine 110 according to FIG. 2 specifically. In the equivalent circuit diagram, rotor winding 101 corresponds to a resistance $R_f$. In the equivalent circuit diagram, stator winding 110a corresponds to a series circuit made up of a resistance $R_S$ and an inductance $L_S$.

Figure 4:
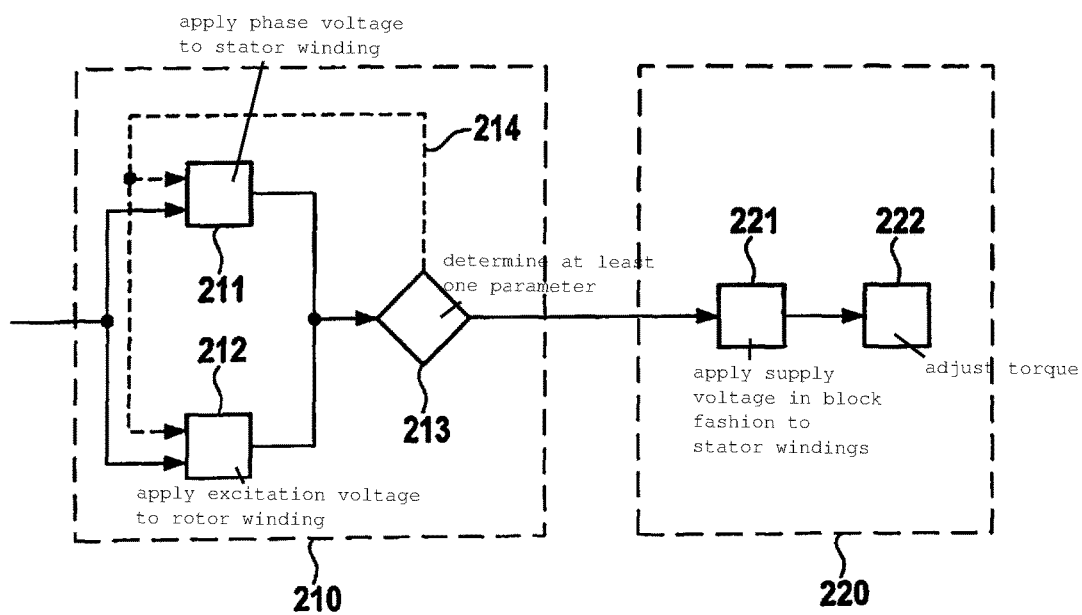
FIG. 4 schematically shows, as a block diagram, a preferred embodiment of a method according to the present invention for switching on an electrical machine.

FIG. 4 depicts, as a block diagram, a preferred embodiment of a method according to the present invention for switching on electrical machine 110.

In motor mode, electrical machine 110 is supplied with an excitation voltage $U_f$ and with phase voltage $U_S$, and converts that electrical energy into mechanical energy in order to assist internal combustion engine 109 using that mechanical energy. The absolute magnitude and amplitude of that phase voltage $U_S$ are predefined in particular by the DC voltage of vehicle battery 105, constituting a supply voltage, which is applied to power converter 106. Electrical machine 110 is switched on first. Thanks to the torque-transferring connection to internal combustion engine 109, the electrical machine turns at a rotation speed $\omega$ predefined by internal combustion engine 109. The electrical machine is switched on in this context in the course of the preferred embodiment of the method according to the present invention.

Electrical machine 110 is operated initially in a PWM operating mode 210. In step 211, a phase voltage having a phase voltage vector is applied to stator winding 110a by pulse width modulation of the supply voltage, that vector corresponding in terms of absolute value and direction to a presently existing pole wheel voltage vector of a pole wheel voltage $U_P$; i.e. a pole wheel angle between the pole wheel voltage vector and phase voltage vector is zero. Because excitation current is not yet flowing at this point in time, the absolute value of the pole wheel voltage is zero, so that control application can be activated without appreciable current flow in the phases.

In a step 212, the excitation voltage $U_f$ is applied by way of field controller 102 to rotor winding 101, with the result that an excitation current $I_f$ is generated in rotor winding 101. The excitation current $I_f$ is regulated to a desired setpoint, in particular by way of a PI controller. When the electrical machine is rotating, the excitation current $I_f$ induces the pole wheel voltage $U_P$ in stator winding 110a. The pole wheel voltage $U_P$ depends on the rotation speed $\omega$ and on the absolute value of the excitation current $I_f$.

In step 213, at least one parameter influencing that pole wheel voltage $U_P$ is determined. Preferably an absolute value and a direction of the pole wheel voltage vector are determined as the parameter influencing the pole wheel voltage $U_P$. Alternatively or additionally, preferably the absolute value of the excitation current $I_f$ and/or the rotation speed $\omega$ of electrical machine 110 can also be determined as the at least one parameter influencing the pole wheel voltage $U_P$. The rotation speed ω of electrical machine 110, and the absolute value of the excitation current $I_f$, are usually known in any case or are determined in any case in the motor vehicle. No additional outlay is therefore necessary in order to determine the absolute value of the excitation current $I_f$ and/or the rotation speed ω of electrical machine 110.

In this specific example, firstly the absolute value of the pole wheel voltage vector is determined as a parameter influencing the pole wheel voltage $U_P$, the absolute value being determined in particular as a function of the excitation current absolute value $I_f$ and the rotation speed ω. This determination is made in particular using the following formula:

$$U_P = \Psi_R (2\pi/60) \omega$$

where $\Psi_R$ is a flux linkage generated by the excitation current $I_f$. The correlation between the excitation current $I_f$ and flux linkage $\Psi_R$ is nonlinear as a result of saturation effects. That correlation between the excitation current $I_f$ and flux linkage $\Psi_R$ is stored, in particular in control device 112, in particular as a characteristic curve or in the form of a regression polynomial. The direction of the pole wheel voltage vector results unconstrainedly from the design and present position of the rotor.

A check is then made as to whether the absolute value and direction of the pole wheel voltage vector, constituting the at least one parameter influencing the pole wheel voltage $U_P$, each attain a specific threshold value. The respective threshold value is selected in such a way that undesired current spikes and large electrical and mechanical loads are avoided upon a switchover from PWM operating mode 210 to block operating mode 220. The respective threshold value is therefore selected in particular as a function of the phase voltage $U_S$ to be applied in the block operating mode. The respective threshold value is accordingly selected in such a way that the switchover into the block operating mode occurs at a point in time at which the pole wheel voltage $U_P$ does not work against the phase voltage $U_S$ to be applied in the block operating mode, which would result in large electrical and mechanical loads.

Advantageously, the respective threshold value therefore corresponds to a respective absolute value and direction of the phase voltage vector of the phase voltage $U_S$ to be applied in the block operating mode directly after activation of the block operating mode. This phase voltage vector is also referred to as a "present" phase voltage vector, even though it exists only theoretically before the block operating mode is switched on. This means in particular that when the respective threshold value is reached, the pole wheel voltage vector and the phase voltage vector have the same absolute value and the same direction upon the switchover to the block operating mode, i.e. the pole wheel angle is 0°. The absolute value of the present phase voltage vector is predefined by the DC voltage of vehicle battery 105 which is applied to power converter 106.

As long as the pole wheel voltage $U_P$ in the PWM operating mode is lower than this absolute value of the phase voltage vector, no phase current $I_S$ can flow via the reverse diodes of MOSFETs 106a of power converter 106.

The absolute value of the pole wheel voltage vector can be adjusted by way of the excitation current $I_f$. The excitation current $I_f$ is raised (indicated by reference character 214) until the absolute value of the pole wheel voltage vector reaches its threshold value. In the course of this the phase voltage is also correspondingly slaved, so that the phase voltage vector continues to correspond to the pole wheel voltage vector in terms of absolute value and direction (likewise indicated by reference character 214).

Once the absolute value and direction of the pole wheel voltage vector reach their respective threshold value, i.e. once the pole wheel voltage vector and phase voltage vector have the same absolute value and the same direction (pole wheel angle=0°) immediately after the block operating mode is switched on, PWM operating mode 210 is deactivated and block operating mode 220 is activated. According to step 221, supply voltage is applied in block fashion to stator windings 110a, in particular by power converter 106.

Thanks to the switchover to the block operating mode in step 221, electrical machine 110 is switched on and can assist internal combustion engine 109. Advantageously, a torque of electrical machine 110 and of internal combustion engine 109 is now adjusted in step 222. The torque is set by varying the pole wheel angle θ, which in turn is set by way of the direction of the phase voltage vector, which in turn is set by corresponding application of control to the power converter. The pole wheel angle θ is varied by way of an appropriate control circuit, in such a way that a desired torque is set.

A correlation between the phase voltage $U_S$, pole wheel voltage $U_P$, phase current $I_S$, and excitation current $I_f$, and thus the theoretical background of the methods according to the present invention, are explained in further detail with reference to FIG. 5.

FIG. 5 depicts by way of example, in a rotating-field-based d-q coordinate system, phasor diagrams or d-q diagrams 501 to 503 for an externally excited synchronous machine, in particular the five-phase electrical machine 110 according to FIG. 2, which can be determined in the course of an embodiment of the invention.

The pole wheel voltage $U_P$ lies by definition on the q axis and is depicted as a first phasor. The q axis constitutes the so-called excitation axis. The d axis is electrically orthogonal to the q axis. The phase voltage $U_S$ is depicted as a second phasor and is shifted with respect to the pole wheel voltage $U_P$ by a pole wheel angle θ. The pole wheel angle θ is also referred to as a "load angle." With electrical machine 110 in the generator mode, the pole wheel angle θ assumes positive values and a pole wheel, or the exciter, "leads." With electrical machine 110 in the motor mode, as depicted in FIG. 5, the pole wheel angle θ assumes negative values and the pole wheel or exciter "lags."

In the block operating mode, the magnitude of the phase voltage $U_S$ is predefined by the DC voltage of vehicle battery 105 applied to power converter 106. In the block operating mode, the phase voltage $U_S$ can therefore vary only in terms of its phase position with reference to the pole wheel voltage $U_P$, i.e. via its pole wheel angle θ with respect to the pole wheel voltage $U_P$. The phase position or pole wheel angle θ can usefully be set by way of power converter 106.

The phase current $I_S$ is depicted in the d-q coordinate system as a third vector. The result is a phase current vector whose locus corresponds to the circle depicted as the pole wheel angle changes from 0 to 360°.

Figure 5A:
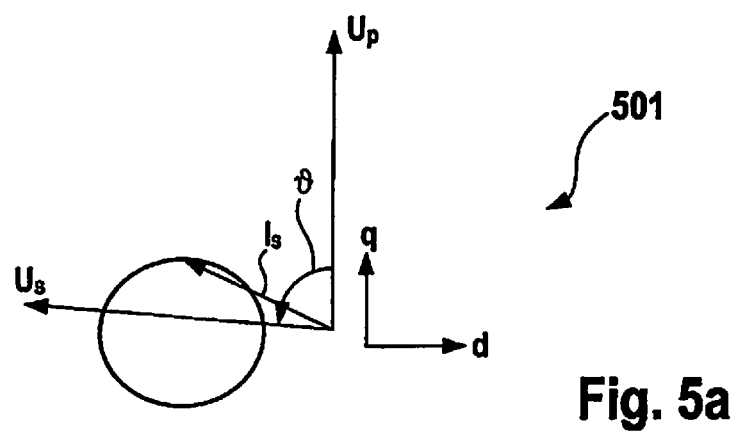
FIG. 5 schematically shows phasor diagrams that can be determined in the course of an embodiment of the present invention.

FIG. 5a depicts a first d-q diagram 501 in which the pole wheel voltage vector $U_P$, constituting the at least one parameter influencing the pole wheel voltage, does not reach the threshold value. It is evident here that the phase current $I_S$ does not become zero for any pole wheel angle θ. It is not possible in this context to switch on electrical machine 110 without overshooting.

Figure 5B:
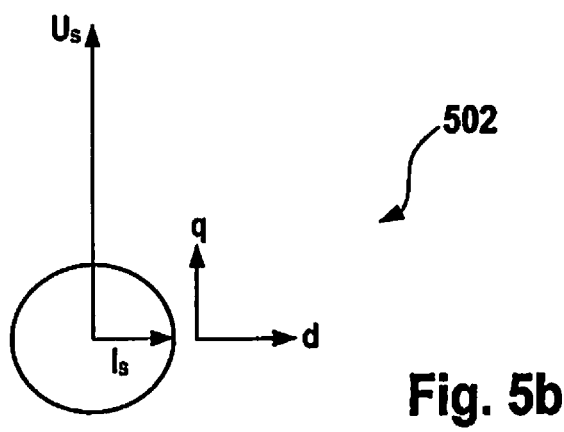

FIG. 5b depicts a second d-q diagram 502 in which the excitation current $I_f$ is switched off, i.e. has a value of zero. The pole wheel voltage accordingly also has a value of zero.

It is evident here as well that the phase current $I_S$ does not become zero for any pole wheel angle θ. In this case as well, it is not possible to switch on electrical machine 110 without overshooting.

Figure 5C:
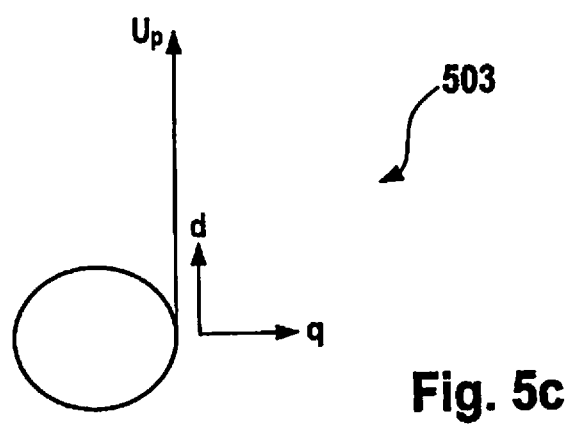

FIG. 5c depicts a third d-q diagram 503 in which the pole wheel voltage vector $U_P$, constituting the at least one parameter influencing the pole wheel voltage, does reach the threshold value. The pole wheel angle θ is 0°, so that the phase position of the phase voltage $U_S$ corresponds to a phase position of the pole wheel voltage $U_P$. Because the phase voltage $U_S$ and pole wheel voltage $U_P$ are identical in terms of absolute value and direction, no phase current $I_S$ is generated here.

In PWM operating mode 210 the phase voltage is applied in accordance with the pole wheel voltage, resulting in phase currents of substantially 0 A. This is achieved by applying to the phases a voltage vector that corresponds exactly, in terms of absolute value and direction, to the present pole wheel voltage $U_P$. Control can be applied either in closed-loop fashion by field-oriented closed-loop control, the values $I_d=0$ and $I_q=0$ being predefined for the phase current in the d-q coordinate system. Control can also be applied, however, in open-loop fashion, since the resulting voltage setpoints are easily obtained as $U_d=0$, $U_q=U_P$.

Figure 6:
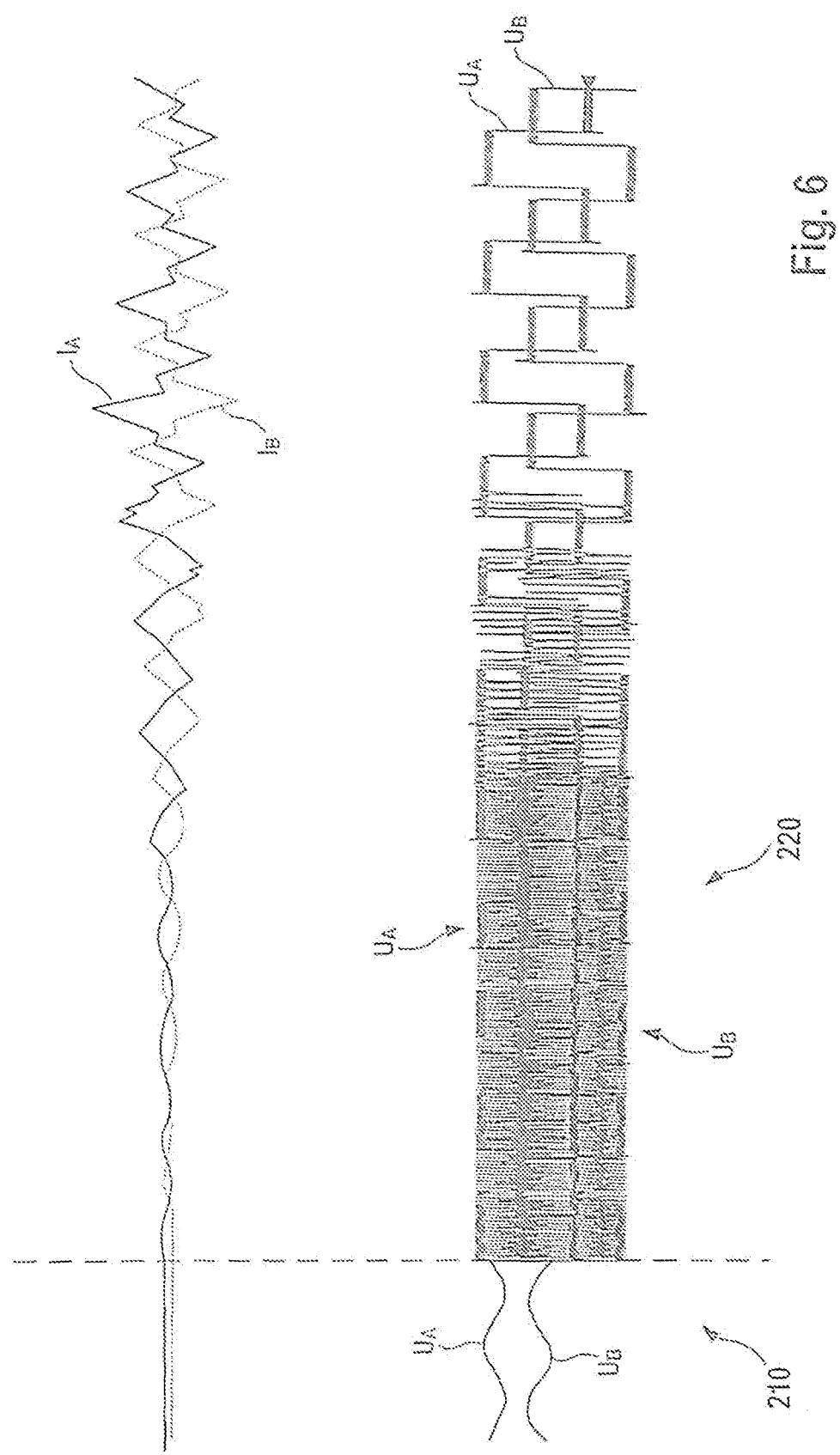
FIG. 6 schematically depicts curves for components of the phase voltage and phase current which exist in the course of a preferred embodiment of the method according to the present invention.

FIG. 6 schematically depicts curves for components of the phase voltage and phase current which exist in the course of a preferred embodiment of the method according to the present invention.

FIG. 6 respectively shows two of the three components, $U_A$ and $U_B$, of a three-phase phase voltage that is applied to the stator winding in the course of switching on, as well as two of the three components, $I_A$ and $I_B$, of the three-phase phase current that is generated thereby in the stator winding. As is evident, the components $U_A$ and $U_B$ are pulse width modulated during PWM operating mode 210, and transition into block voltages in block operating mode 220. The components $I_A$ and $I_B$ of the phase currents are initially close to zero during PWM operating mode 210, and are switched on in the block operating mode almost without overshoots.

What is claimed is:

1. A method for switching on a multi-phase electrical machine in a motor vehicle, the multi-phase electrical machine having a rotor having a rotor winding, and a stator having a multi-phase stator winding, the method comprising:
applying a phase voltage having a phase voltage vector, in a PWM operating mode, to the stator winding, the vector corresponding in terms of absolute magnitude and direction to a pole wheel voltage vector of a pole wheel voltage;
energizing the rotor winding by an excitation current; and
deactivating the PWM operating mode, and activating a block operating mode for application of the phase voltage when at least one parameter influencing the pole wheel voltage reaches a threshold value.

2. The method as recited in claim 1, wherein at least one of an absolute value of the pole wheel voltage vector, and a direction of the pole wheel voltage vector, is used as the at least one parameter influencing the pole wheel voltage.

3. The method as recited in claim 1, wherein the threshold value corresponds to an absolute value of the phase voltage vector or a direction of the phase voltage vector of the phase voltage to be applied in the block operating mode.

4. The method as recited in claim 3, wherein the absolute value of the phase voltage vector of the phase voltage to be applied in the block operating mode is defined by a DC voltage of an electrical system, connected to the electrical machine, of the motor vehicle.

5. The method as recited in claim 3, wherein at least one of an absolute value of the excitation current, and a rotation speed of the electrical machine, is used as the at least one parameter influencing the pole wheel voltage.

6. The method as recited in claim 1, wherein, in the block operating mode, a torque is set by specifying a specific pole wheel angle between the phase voltage and the pole wheel voltage.

7. The method as recited in claim 1, wherein the electrical machine is operated in motor mode or generator mode.

8. A computation unit for switching on a multi-phase electrical machine in a motor vehicle, the multi-phase electrical machine having a rotor having a rotor winding, and a stator having a multi-phase stator winding, the computation unit designed to:
apply a phase voltage having a phase voltage vector, in a PWM operating mode, to the stator winding, the vector corresponding in terms of absolute magnitude and direction to a pole wheel voltage vector of a pole wheel voltage;
energize the rotor winding by an excitation current; and
deactivate the PWM operating mode, and activate a block operating mode for application of the phase voltage when at least one parameter influencing the pole wheel voltage reaches a threshold value.

9. A non-transitory machine-readable storage medium on which is stored a computer program for switching on a multi-phase electrical machine in a motor vehicle, the multi-phase electrical machine having a rotor having a rotor winding, and a stator having a multi-phase stator winding, the computer program, when executed by a computation unit, causing the computation unit to perform:
applying a phase voltage having a phase voltage vector, in a PWM operating mode, to the stator winding, the vector corresponding in terms of absolute magnitude and direction to a pole wheel voltage vector of a pole wheel voltage;
energizing the rotor winding by an excitation current; and
deactivating the PWM operating mode, and activating a block operating mode for application of the phase voltage when at least one parameter influencing the pole wheel voltage reaches a threshold value.

* * * * *